Figure 1:
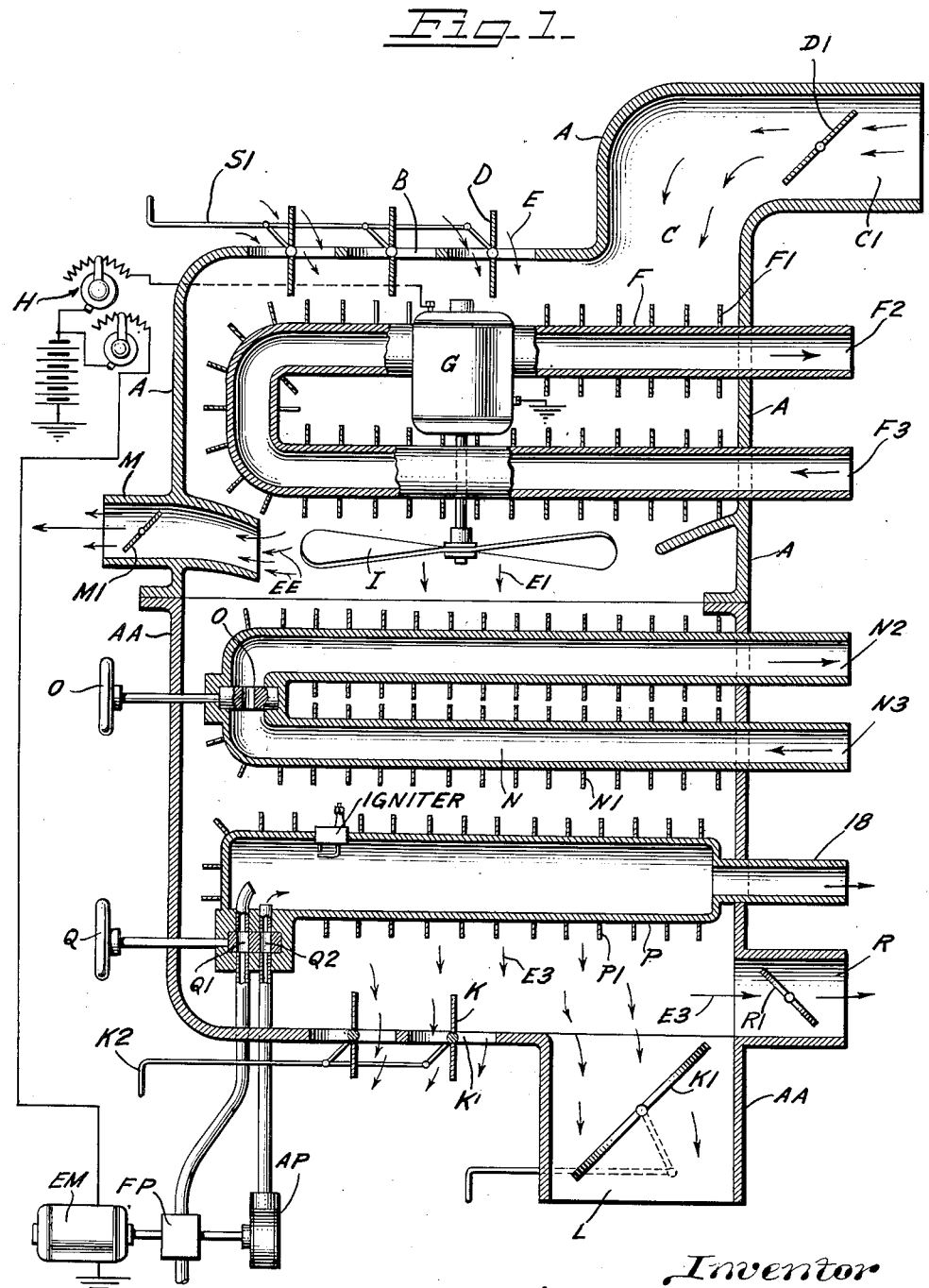

Dec. 16, 1952     H. H. WIXON     2,621,857
AUTOMOBILE HEATER

Filed Jan. 11, 1947     3 Sheets-Sheet 1

Inventor
Howard H. Wixon

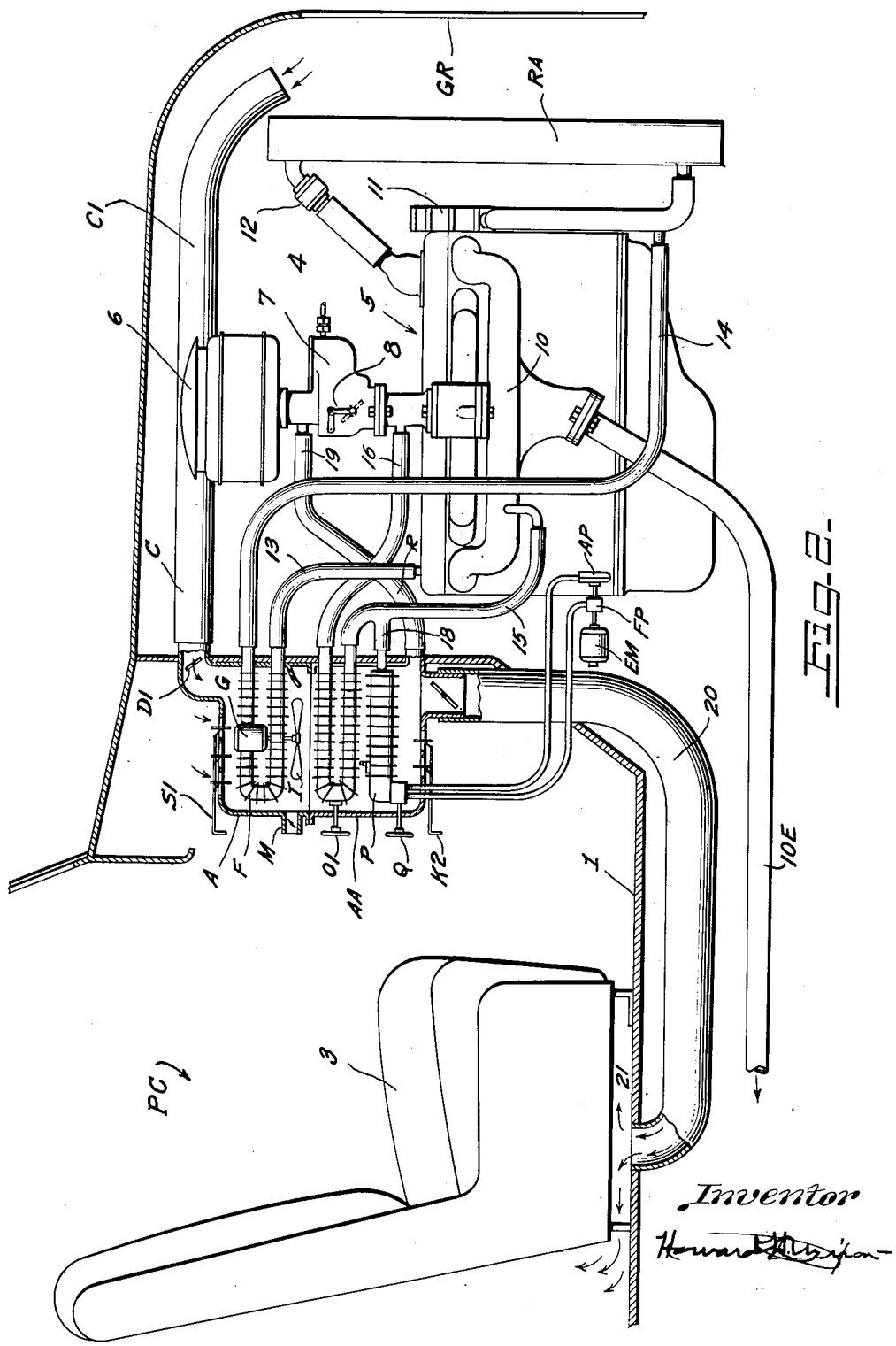

Dec. 16, 1952 H. H. WIXON 2,621,857
AUTOMOBILE HEATER
Filed Jan. 11, 1947 3 Sheets-Sheet 3

Inventor
Howard H. Wixon

Patented Dec. 16, 1952

2,621,857

UNITED STATES PATENT OFFICE 2,621,857

AUTOMOBILE HEATER

Howard H. Wixon, Chicago, Ill.

Application January 11, 1947, Serial No. 721,552

3 Claims. (Cl. 237—12.3)

My invention relates to heaters for the comfort of passengers in automobiles or vehicles broadly intended to carry persons and powered by an internal combustion engine, and the method of operating the same is in connection with said engine, or vice versa. The term car or "automobile" is broadly the same as, or equivalent to, "truck, bus, airplane, or other vehicle," in which the heat of the engine is used as a heat source to operate said heater for the comfort of persons in said automobile.

The object of my invention is to overcome the deficiencies of the present known water heaters, to provide a greater amount of heat, quicker than now possible with water heaters, and to more effectively use the waste heat of the engine in providing heat for passenger space. The object is also to provide, within the same general heating unit (heater) a means of furnishing heat independently of the engine or in addition thereto.

I achieve the object of my invention by employing three separate forms of heating elements, either working together or separately within the same heater unit ordinarily called a heater head, which may be within the automobile body as usual or arranged otherwise to furnish heat to the body compartment, and it is in the arrangement, combination and operation of these elements (or relative to the engine) that is the chief novelty of my invention.

These three heating elements are a (1) hot water, an (2) exhaust gas heater, and (3) a combustion gas heater, which are preferably within one assembled heating unit or head, and as, or may be, operated in relation to each other as variations of a unified operation. Suitable parts therefor may be assembled with such relative proportions, location and controls as are particularly adapted to use in the vehicle as desired, in accordance with the claims.

The heating results obtainable from my invention are more especially noticeable in cold weather, when a large amount of heat is desired quickly when starting a cold engine, to warm up a cold car, and may even be used as a heat source in starting a cold engine, which engine will afterwards supply or operate as the heat source for the normal operation of my invention.

The heat obtainable from an automobile heater may be described as "normal" when the engine reaches its full operating temperature, as "abnormal" when the engine is cold or just starting or warming up, and as "extreme" when the automobile has been left standing in the cold and the engine is difficult to start due to the cold. Under extreme conditions my heater furnishes heat to aid in warming up and starting the engine, which engine afterwards supplies all the heat normally required in the use of my heater in heating the automobile passenger space.

The ordinary construction of elements suitable to make my invention, and operate the same, is well known and need not be described herein, but may be represented more or less as a diagram in part or assembled.

Of the ordinary construction, it will be apparent that the part of this specification referring to the water heater element is not in itself new and may be of any variety or form known. The general term "water heater" refers to a type generally used in the circulating system of an engine as a "heat source" regardless of the liquid used therein. Also, the common or automatic control of water or air in relation to the water heater element is implied as not new.

Also the ordinary construction, use and control of a combustion heater element is not in itself new and may be of any known variety or construction.

The exhaust gas heater element is new as particularly specified in the claims.

The novelty of my invention is a matter of the combination of more than one of these heating elements in a combined or supplemental operation or the particular application or operation of part or parts of my invention, particularly specified in the claims.

It may also be explained that my invention is based on the availability of heat from the engine as waste heat, which varies with different engines, and uses preferably liquid heat from the engine cooling system and also heat from the exhaust gas from the engine exhaust manifold, these two forms of heat being circulated by the engine. But the combustion gas heating element of my invention, which is used as a supplementary heat source, may have the exhaust gas circulated therethrough by means of the engine or otherwise independently circulated such as for instance from an electric motor. Also the term "gas heater," as broadly used herein refers to either an "exhaust" gas heating element or a "combustion" gas heating element (or both exhaust and combustion together), in its supplemental use with the water heater.

Figure 3A:
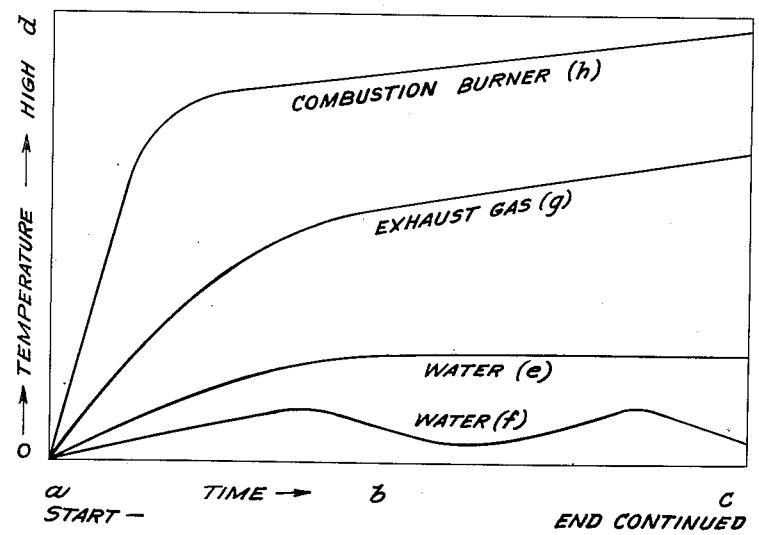
Figure 3B:
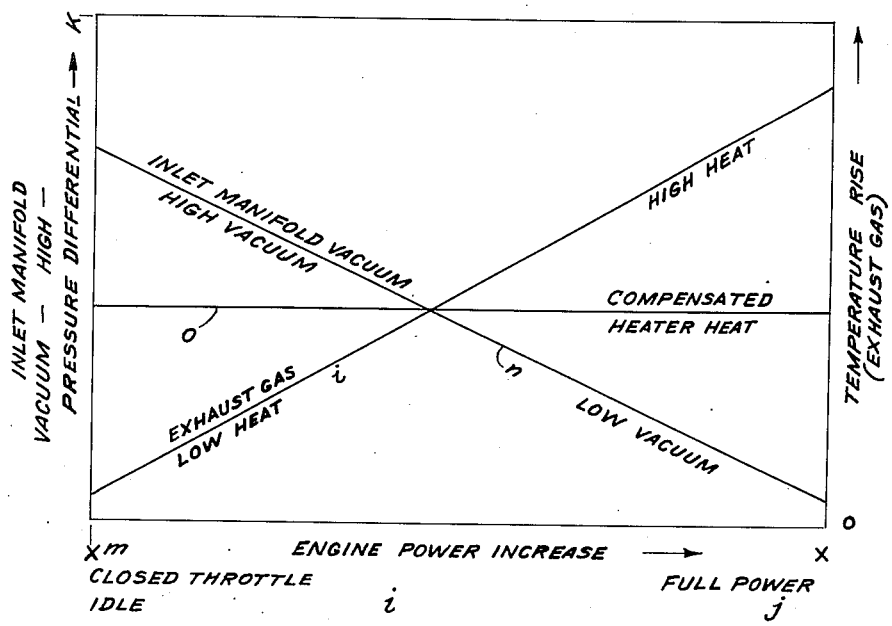

The drawings herewith are more conveniently referred to in the course of this description, but the main part of my invention is shown in Fig. 1, which is a cross section of a preferred form of heater having all the heating elements within one unit or assembly known as a heater head. Fig. 2 is a cross section illustrative of the installation in an automobile, Figs. 3A and 3B are diagrams of "heat availability" from the engine.

In Fig. 1, a general assembly section is shown, comprising the basic elements of the heater. A is the core having air inlet or inlets B from the passenger compartment and inlet C from outside the vehicle. These inlets are controlled by shutters D, and D1, either separately or together as desired, air currents being indicated progressively by arrows E, E1, E2, and E3 to outlet K' leading to the passenger compartment, outlet L leading to further removed outlets in the car and outlet R to the carburetor inlet, these outlets being controlled by shutters K, K1, and R1, either separately or together as desired. Also, one or more intermediate outlets M are provided for windshield defrosters, and controlled by shutter M1.

I prefer that the case be arranged vertically or so that the air enters at the top and progresses downward as indicated by said arrows, and the air is heated progressively by three distinct types of heating elements, a water heater F, an exhaust gas heater N, a combustion heater P, or is heated separately by any one of these three elements, or is heated by any combination of these elements as desired. I also prefer that the electric motor G which drives fan I, and is controlled by control H, shall be common to all heating elements in creating or forcing the air currents or air stream (but separate motors may be used with any inlet or outlet if desired) and also in creating a certain amount of auxiliary flow EE to outlet M. Air currents, created by fan I may force an air flow through any of the bottom outlets K, L or R as desired, or a similar air current may be created by the engine inlet suction connected to R for heat to the engine inlet.

First, in the upper part of the case, a heating coil or radiator F is disposed in the path of the incoming air, heat being supplied thereto by water, or other liquid, from the engine circulating system. This radiator may be of any usual form, construction or control relative to its water heating supply from the engine. And the entering air is heated in passing from E, to E1, only to the extent of the heating effect of the water heating element F.

Second, below the fan, or below the water heater element, an exhaust gas heating coil or radiator N is similarly disposed in the further path of this air current as indicated from E1 to position E2, and the heating effect of this exhaust gas heating element N is controlled by valve O having the handle O1 outside the case. This exhaust gas element N is supplied with heat from and circulated by the engine, but it may be connected to the combustion heater P for alternate heating or as a part of the following combustion heater.

And third, to illustrate the action more clearly, a combustion heating element P (or burner) is shown as a distinctly separate element, in the further path of the air current from E2 to E3, and thence to the air outlets. This combustion heater (or enclosed burner) may be either of the well known type caused to operate by the engine suction, or, as I prefer, of the type completely self contained and operated by an electric motor and having its own fuel and air pumps, control, and igniter, as is also now well known, and of any suitable construction to operate independent of the engine operation. Particular construction of the combustion burner P is not a feature of the invention and may be any suitable construction, but the preferred type is one having an electric motor EM driving a fuel pump FP, and an air pump AP with an igniter, this preferred type being operated by turning on its electric motor or other automatic controls (or valve Q) by which the fuel and air are supplied to the combustion heater P where they are ignited and burn to furnish heat, the exhaust gas from the combustion burner being conveyed either to the engine exhaust pipe or to the outside by means of an independent outlet.

My invention as so far described is further illustrated as installed for operation in an automobile, in connection with the engine thereof, for heating the passenger space and other heating action, as shown in Fig. 2.

In Fig. 2, 1 is the compartment automobile body having the passenger compartment 2, further indicated by the seat 3, with the engine located in the front of the vehicle and in front of the conventional fire wall, the heater A being shown mounted on said fire wall or any other desirable location within the passage compartment or otherwise and with the heating element connected to the engine. The engine is indicated by the engine cylinder block 5, and having an air inlet 6, to carburetor 7, controlled by throttle 8 to inlet manifold 9, the exhaust manifold 10, being extended down to exhaust pipe 10E, the engine block 5 and both manifolds being connected to my heater A.

The water heating radiator F in my heater A, is connected to the water jacket and circulating system of the engine and is supplied with hot water from the engine under the influence of pump 11 and thermostat 12 as usual, and connected as shown by hose 13 to the heater and therefrom by hose 14 to the return line hose below the pump 11.

The exhaust gas heating element N in my heater is connected as directly as possible by a flexible pipe 15 to the exhaust manifold 10 and to the inlet manifold 9 below throttle 8 and by tube 16, so that the suction of the engine draws the exhaust gas from 10, through heater N, and into inlet manifold 9 and into the engine when in operation.

The combination burner P may have its outlet 18 connected to the pipe 15 in which case the combustion gas heat will also pass from the combustion burner through exhaust gas heater N to the inlet manifold 9 when the engine operates, but will pass into the exhaust manifold 10 when the engine is not operating, but if the combustion burner is of the well known type dependent on suction for operation, then the connection 18 should be to the suction line 16.

The air outlet R is connected by duct or pipe 19 to the air inlet of the carburetor 7 above (or before) throttle 8, thus providing a means of furnishing heated air to the engine suction inlet in extreme or very cold starting of the engine. And the air outlet L is connected by a duct 20 to a region 21 outlet under the seat or other place or places in the car body, while the outlet K is directly for the front seat heating effect or driver comfort.

The drawings of Fig. 3 may now be considered in relation to the operation of my invention in connection with the engine from which the normal heat is obtained.

In Fig. 3A at point a, starting with a cold engine, the water temperature, line e, rises slowly over the time to b, where the water temperature remains normally constant for the remaining time, and it will be noted that the water temperature is not high at any time and is required to be below the boiling of any antifreeze liquid used. However, if a car is run for only a short time (or distance), then stopped and run further on short runs, the water temperature may never reach a satisfactory running temperature as indicated by the water line f. The exhaust gas heat available however is responsive almost at once from the start of the engine, and reaches a much higher temperature in a very much shorter time, and the exhaust gas can well be used for quick heat or to supplement the heat obtainable from water. The heat from a combustion burner, if of the preferred electric motor operated type, may reach a high heat quite rapidly even before the start of the engine, but as it requires fuel to produce the heat obtained, it is desirable to use only at those times when much heat is needed quickly and is intended to be shut off when heat demand can be met from the engine. From these curves, it can be seen that each of the three forms of heat has desirable qualities which can supplement each other as intended in my invention.

In Fig. 3B, is shown how the engine vacuum (pressure available to circulate the exhaust gas) is very high at point h, but the heat or temperature of exhaust gas is then at its lowest, so that the largest quantity of exhaust gas is circulated at this time. Also that as the engine throttle 8 is opened, the vacuum goes down but the effective heat of the exhaust gas very greatly rises so that when the engine is running with a fair or considerable amount of power the exhaust gas furnishes or makes a substantial amount of heat without requiring much engine vacuum to circulate a great deal of it. This action furnishes a considerable amount of automatic compensation for the great amount of variation in heat of exhaust gas as furnished by the engine under variations of running (load), and tends to even out the heat action of the exhaust gas heater N as represented by the line O in the diagram, and is quite important in securing satisfactory results with variations of engine operation.

In the operation of my invention starting from the extreme cold condition where it is too cold to even start the engine properly, the preferred combustion heater may be turned on and shutter controls set to open R while closing others. Heat then is supplied to the carburetor air under engine suction and also under pressure of fan I aiding in vaporization and smooth running until the engine warms up sufficiently to run smoothly. As the engine runs, with the valve O opened, controlling exhaust gas heater N, the exhaust gas heater quite rapidly begins to furnish heat and the combustion gas heater may be turned off, and other controls turned to furnish heat to the car or passenger compartment well before the water heater comes into effective action. When the water heater alone can furnish sufficient heat, the exhaust gas heater may be turned off, so that the heater may then operate in the normal manner of a water heater, and is then probably the most satisfactory form of heating a car from the engine waste heat.

It is obvious that wide variations of heater operation, and combinations may be made as desired within my invention and also as to the application of well known automatic controls to this operation, particularly as to the control of any element in well known manner.

I prefer that the upper part of my heater be assembled with the upper case A containing the water heating radiator unit as an operating assembly that can be mounted on the automobile fire wall or bulkhead, with the lower case AA containing the gas heating radiator unit or units as a separate assembly that can be detached from the upper case unit A, to facilitate service etc. of my invention, in any well known manner.

Having described my invention, what I claim as new and desire to secure by Letters Patent is:

1. In a heating system for a vehicle having a space to be heated and an internal combustion engine for the vehicle, in combination, a space heating unit comprising a casing through which air from the space flows from an inlet to an outlet of said casing and then to the space, a controlled damper in said inlet, a second separate inlet to the casing also having a controlled damper therein and connected by conduit to the exterior air from said vehicle space, a liquid type heat-exchanger in said casing disposed in the path of air flow and connected to receive heated liquid from the engine cooling system, a combustion burner forming a heat-exchanger also disposed within said casing in the path of air flow to cool the burner and to exchange heat of combustion to the air to be heated, means for controlling the operation of said burner, a motor driven fan to create air flow through the heater casing and for the space, and means to control the fan motor to regulate the heated air output to the heated space and whereby air entering from the exterior and from the space is selectively proportioned in the said casing then heated by contact with heated surface of said heat-exchangers and then passed by means of the fan force to the space to be heated.

2. In a heating system for a vehicle having a passenger space to be heated and an internal combustion engine for the vehicle, a heater assembly comprising a combustion type heater adapted to operate in cooperation with the engine, means for supplying fuel and air through conduit connections to the inlet of said heater and a second conduit connected to the outlet of said heater for conveying products of combustion from the heater to the exterior of said space, fan means for creating a stream of moving air over said heater, an enclosure for said fan and heater having an air inlet from said space and an air outlet to said space, a second separate outlet from said enclosure connected by conduit to the engine air intake at a point following the air supply inlet and before the engine fuel mixing device to the engine, and control means for selectively controlling said air outlets, whereby in operation said fan delivers heated air to said space and selectively as controlled delivers heated air to the engine intake to aid in starting the engine.

3. In a heating system for a vehicle having a space to be heated and an internal combustion engine for the vehicle and creating engine heat in operation, a separate space heating unit comprising a casing through which air from the space flows from an inlet to an outlet of said casing and then to the space, a controlled damper in said inlet, a second separate inlet to the casing also having a controlled damper therein and connected by conduit to the exterior of said engine and vehicle space, a combustion burner type heat-exchanger with an enclosed mixing combustion chamber and disposed within said casing in the path of air flow to cool the burner and thereby exchange heat of combustion from the chamber to the air flow, a motor driven fuel and air pump unit connected to the inlet of the combustion burner and an exhaust outlet connection therefrom to the exterior of the space, means for controlling said air and fuel supply to the combustion chamber and thereby controlling the operation of the burner heat-exchanger, a motor driven fan to create air flow through the heater casing and for the space, and means to control the fan to regulate the air flow passing over the burner heat-exchanger to cool the burner and exchange heat of combustion to heat the air flow output to the heated space and whereby air entering from the exterior and recirculated air from the space is selectively proportioned in said casing then heated by contact with heated surface of said heat-exchanger and then passed by means of the fan force to the space.

HOWARD H. WIXON.

REFERENCES CITED

The following references are of record in the file of this patent:

UNITED STATES PATENTS

| Number | Name | Date |
|---|---|---|
| 1,284,643 | Francisco | Nov. 12, 1918 |
| 1,416,946 | Cobus | May 23, 1922 |
| 1,441,486 | Denman-Jones | Jan. 9, 1923 |
| 1,947,716 | Hyatt | Feb. 20, 1934 |
| 1,966,882 | Bucklen | July 17, 1934 |
| 2,024,364 | Hyatt | Dec. 17, 1935 |
| 2,038,193 | Parsons | Apr. 21, 1936 |
| 2,131,017 | Lintern et al. | Sept. 20, 1938 |
| 2,147,906 | Lintern | Feb. 21, 1939 |
| 2,155,278 | Mautsch | Apr. 18, 1939 |
| 2,191,173 | McCollum | Feb. 20, 1940 |
| 2,256,303 | Williams | Sept. 16, 1941 |
| 2,268,440 | Boshuyzen | Dec. 30, 1941 |
| 2,300,010 | Rose | Oct. 27, 1942 |
| 2,342,901 | Schutt et al. | Feb. 29, 1944 |
| 2,405,144 | Holthouse | Aug. 6, 1946 |
| 2,431,918 | Catlin | Dec. 2, 1947 |